United States Patent [19]
Hoffmann et al.

[11] Patent Number: 5,643,985
[45] Date of Patent: Jul. 1, 1997

[54] PROCESS FOR THE STABILIZATION OF AND STABILIZER MIXTURES FOR RECYCLED PLASTICS

[75] Inventors: Kurt Hoffmann, Lautertal; Heinz Herbst, Lautertal-Reichenbach; Rudolf Pfaendner, Rimbach/Odenwald; Hans-Jürgen Sander, Lorsch, all of Germany; Franciszek Sitek, Therwill, Switzerland

[73] Assignee: Ciba-Geigy Corporation, Tarrytown, N.Y.

[21] Appl. No.: 403,914

[22] PCT Filed: Sep. 14, 1993

[86] PCT No.: PCT/EP93/02486

§ 371 Date: Mar. 21, 1995

§ 102(e) Date: Mar. 21, 1995

[87] PCT Pub. No.: WO94/07946

PCT Pub. Date: Apr. 14, 1994

[30] Foreign Application Priority Data

Sep. 25, 1992 [CH] Switzerland ............... 3012/92

[51] Int. Cl.$^6$ ............... C08K 5/09; C08K 5/526
[52] U.S. Cl. ............... 524/291; 524/343; 524/399; 524/400; 524/151; 252/400.23; 252/400.24; 252/400.52; 252/400.53; 252/403
[58] Field of Search ............... 524/151, 291, 524/343, 399, 400; 252/400.23, 400.24, 400.52, 400.53, 403

[56] References Cited

U.S. PATENT DOCUMENTS

| | | | |
|---|---|---|---|
| 3,867,325 | 2/1975 | Hutton et al. | 260/23 |
| 4,251,407 | 2/1981 | Schroeder et al. | 524/400 |
| 4,290,941 | 9/1981 | Zinke et al. | 524/343 |
| 4,652,282 | 3/1987 | Ohmori et al. | 524/400 |
| 5,017,633 | 5/1991 | Tschevlin | 524/343 |
| 5,227,418 | 7/1993 | Mueller, Jr. et al. | 524/400 |

OTHER PUBLICATIONS

Chem. Abst. 102:167333x (1985).

Derw. Abst. 89–066593 = DE 3,322,938.

G. Scott, pp. 8/1–1 to 8/1–19, The Role Of Stabilizing Additives in Polymer Recycling (1993).

Marek Gnatowski, pp. 308–311, Plastics Waste Management edited by N. Mustafa.

F.P. LaMantia and D. Curto, pp. 27–37, Recycling Of Plastics Materials.

*Primary Examiner*—Kriellion S. Morgan
*Attorney, Agent, or Firm*—Michele A. Kovaleski

[57] ABSTRACT

Recycled plastics, predominanty thermoplastics, from domestic, commercial and industrial waste can be stabilized against thermooxidative degradation by adding a combination of a sterically hindered phenol with an organic phosphite or phosphonite and a metal salt of a fatty acid.

18 Claims, No Drawings

PROCESS FOR THE STABILIZATION OF AND STABILIZER MIXTURES FOR RECYCLED PLASTICS

The invention relates to a process for the stabilization of recycled plastics, as predominantly produced in the household, in commerce or in industry and in useful material collections, and to the stabilizer mixtures which can be used for this purpose.

Recycling of waste is a problem of increasing importance for ecological reasons. The recycling of paper, textiles, glass or metals already takes place on a large scale, whether by separate collection or by sorting of the refuse. The recycling of plastic waste and used plastics is also an increasing aim. Thermoplastics are generally processed by re-melting.

However, the plastic waste produced in the household, in commerce or in industry or the plastic used for materials or used plastics obtained from collections or a return obligation, for example in specific sectors of industry, such as the automobile industry, electrical industry, agriculture or the packaging industry, predominantly comprises thermoplastics based on polyolefins, styrene polymers, polyvinyl chloride or polyethylene terephthalate.

Used plastics which are valuable raw materials can be obtained either as a single material or as a mixture. Single-material plastic waste can be produced directly in the production of plastic parts or obtained by separate collections.

On the other hand, the recycling of used plastics frequently means the use of a mixture of different types of plastic. Known industrial separation methods, for example hydrocyclone separation, mostly give only moderately clean fractions of various plastic mixes, for example a mixture of polyolefins.

The use of plastic mixtures is associated with technical problems, since individual types of plastic have only restricted miscibility with one another, or none at all. Although various types of thermoplastics can be processed by melting and moulding, the resultant mixtures (polyblends) of immiscible plastics are inhomogeneous when considered microscopically, i.e. on a microscopic level they Comprise different solid phases. This has a considerable adverse effect on the mechanical properties. Recyclates of this type can normally only be used for purposes where relatively low length requirements are made, for example as fillers or where thick-walled pans are used, for example noise protection dams.

Typical incompatible combinations which occur in domestic refuse are, for example, polyethylene and PVC or polyethylene and polystyrene or PET and polyolefins. In order to solve this problem, it has been proposed to add polymeric compatibilizers, also known as solid phase dispersants. Thus, for example, the addition of chlorinated polyethylene is capable of homogenizing mixtures of polyethylene and PVC. The addition of styrene-butadiene copolymers is capable of homogenizing mixtures of polyolefins and polystyrene. As a result of such a homogenization, the mechanical properties improve so much that these polyblends are also suitable for high-performance uses. A review of these developments is given by C. Sadrmohaghegh, G. Scott and E. Setudeh in Polym. Plast. Technol. Eng. 24 (1985), 149–185.

In an article which appeared in Polymer Eng. and Science, Vol. 17, pp. 700–705 (1977), the effect of small amounts of PVC and CPE on recycled polyethylene is studied, the authors observing that satisfactory stabilization of such recyclates is still not possible.

For the stabilization of recycled high-density polyethylene, P. Vink, R. T. Rotteveel and J. D. M. Wisse in Polymer Degr. and Stability, Issue 9, p. 133 (1984) studied various stabilizers from the classes of the phosphites, hindered phenols, benzotriazoles, hindered amines and phosphonites.

These authors also indicated that the recyclates must be re-stabilized. Although the plastics have mostly been treated originally with stabilizers against thermooxidative and in some cases also against photooxidative degradation, these stabilizers are lost during use of the plastics, during storage of the waste and during processing of the recyclates, in some cases due to migration, extraction or by degradation. Additionally, a recycled plastic generally differs structurally and also chemically from a new plastic as a consequence of the prior use or due to storage and processing; for example, sites of attack for oxidative degradation may already have formed. A recycled plastic therefore requires, for example, a relatively large amount of stabilizers or alternatively stabilizers which take into account these particular circumstances. The difficulty of finding suitable stabilizers is due to the specific type of previous damage/impurities, which may have taken place over an extended period.

Stabilization of a plastic mixture is likewise a difficult task, since each type of polymer makes specific requirements of the stabilizers. Thus, for example, completely different stabilizers are used for vinyl chloride polymers than for polyolefins or styrene polymers.

It would therefore be necessary to add a mixture of various stabilizers in order to stabilize a plastic mixture. In the case of complex plastic mixtures, this is a complicated method. In addition, various stabilizers can have adverse effects on one another or a stabilizer for one component can be damaging for the other component.

This problem has also been studied in the abovementioned literature and in Europ. Polym. J. 18 (1982), 1007, and the authors come to the conclusion that certain nickel complexes, in particular nickel dialkyldithiocarbamates, effect the best stabilization both against thermooxidative and against photooxidative degradation of polyethylene/polystyrene and polyethylene/polypropylene blends which have been homogenized by means of a compatibilizer. There is no mention therein of the stabilization of recyclates also containing PVC or of complex recyclate mixtures.

According to M. Riedel "Neue Stabilisatoren zur Verbesserung des Recycling", Industrie Anzeiger, 99, pages 1367–1369 (1977) and F. Mitterhofer "Stabilization aspects for the recycling of plastic scrap and waste", Conf. Int. Trade Fair Recycling, Refuse Collect. Waste Treat. "Elmia Avfall 79", Jönköping, Sweden, pages 657–667 (1979), polypropylene can be stabilized by tetrakis (2,4-di-tert.butylphenyl) 4,4'-biphenylenediphosphonite, whereby the polymer already contains calcium stearate and tetrakis [methylene 3-(3',5'-di-tert.butyl-4'-hydroxyphenyl)propionate]methane. The stability of the polypropylene is better when compared with a conventional phosphite after multiple extrusion which is regarded as a simulation of the deterioration occurring in recycled polypropylene.

Stabilizing mixtures containing, inter alia, a phosphite or phosphonite, a sterically hindered phenol and a fatty acid metal salt have been proposed for use in virgin polymer, see for example, JP-A-01-020249, DE-A-23 08 225 or DE-A-33 22 938.

It has now been found that both sorted and mixed recycled plastics can be stabilized in a simple and economical manner against thermooxidative degradation during processing and subsequent use by means of a mixture of stabilizers known per se.

The invention relates to a process for the stabilization of recycled plastics, predominantly thermoplastics, obtained from domestic, commercial and industrial waste or from useful material collections, which comprises adding from 0.01 to 10% by weight of a mixture of a) at least one sterically hindered phenol, b) at least one organic phosphorus or phosphorus ester and c) at least one metal salt of a fatty acid to these plastics.

The a:b weight ratio is preferably from 20:1 to 1:20, particularly preferably from 10:1 to 1:10 and most preferably from 4:1 to 1:4. The (a+b):c weight ratio is preferably from 10:1 to 1:20, particularly preferably from 5:1 to 1:5 and most preferably from 3:1 to 1:3.

The plastics to be stabilized are, for example, used plastics from households and commerce (for example supermarkets), which predominantly originate from packaging materials. These can be, for example, films, bags, bottles and other containers or foams. Other materials may also be present. However, it is also possible for the above-described single-material plastics which have been previously damaged by use, storage or processing to be stabilized. The materials originate, for example, from separation/sorting or from specific industrial sectors and return obligations, for example from the automobile industry, electrical/electronic industry, construction, agriculture and the textile industry.

The invention therefore relates to single-material recycled plastics, for example from the polymer classes consisting of the polyolefins and polystyrene, to defined recycled mixtures, known as polymer blends, and also to the stabilization of recycled plastic mixtures.

These mixtures of recycled plastic products predominantly comprise thermoplastics, for example polyolefins, polystyrene, polyvinyl chloride and engineering plastics, such as polyamides and polyesters. The recycled plastic mixtures predominantly comprise 25–100% by weight, in particular 35–99% by weight, of polyolefins, 0–25% by weight of polystyrene, 0–25% by weight of polyvinyl chloride and 0–25% by weight of other thermoplastics, it also being possible for mixtures to be present within these groups of thermoplastics. Non-thermoplastics may also be present in the mixture in small amounts.

In particular, the invention relates to the stabilization of recycled plastic mixtures which comprise 55–95% by weight of polyolefins, 5–25% by weight of polystyrene, 0–15% by weight of polyvinyl chloride and 0–10% by weight of other thermoplastics.

In the case of single-material recyclates, the invention relates, in particular, to the stabilization of polyolefins and polystyrene. Particular preference is given to the stabilization of single-material polyolefin recyclates, for example polypropylene, high-density polyethylene, low-density polyethylene and polypropylene blends, and copolymers, such as PP/EPDM and PP/PE.

The invention furthermore relates to the stabilization of polyolefin mixtures which comprise virtually exclusively polyolefins of various structure.

In plastic mixtures, the dominant polyolefins are usually polyethylene (PE) and polypropylene (PP), in particular low-density polyethylene (LDPE), linear low-density polyethylene (LLDPE) and high-density polyethylene (HDPE), furthermore copolymers such as ethylene-propylene CEPM) and ethylene-propylene-diene (EPDM) copolymers and ULDPE-MDPE. Polystyrene (PS and EPS) is also taken to mean copolymers containing styrene (for example ABS, ASA, HIPS and IPS), and polyvinyl chloride (PVC) is also taken to mean copolymers predominantly comprising vinyl chloride (for example CPE). Of other thermoplastics, useful material collections principally contain polyethylene terephthalate (PET), and in addition polyamides, polycarbonate, cellulose acetate and polyvinylidene chloride. Secondary amounts, up to about 5%, of non-thermoplastics, for example polyurethanes, formaldehyde resins and phenolic resins, and typical amino resins, and also elastomers, for example vulcanized or unvulcanized rubber, may also be present. In certain plastic wastes, small amounts of foreign substances, for example, paper, pigments and adhesives, which are frequently difficult to remove, may also be present. These foreign substances may also originate from contact with diverse substances during use or processing, for example fuel residues, paint components, traces of metal, initiator residues or traces of water.

From 0.05 to 5% by weight of the mixture of a, b and c are preferably added to the recyclate. From 0.1 to 2% by weight of the mixture of a, b and c are particularly preferably added and most preferably from 0.1 to 0.5% by weight of the mixture of a, b and c are added.

The sterically hindered phenols used as component a are known stabilizers against thermooxidative ageing of plastics, in particular polyolefins. These compounds preferably contain at least one group of the formula

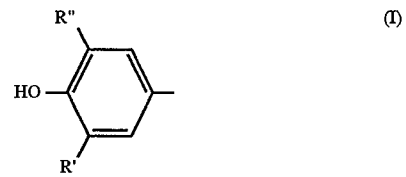

in which R' is hydrogen, methyl or tert-butyl; and R" is unsubstituted or substituted alkyl or substituted thioether.

Examples of sterically hindered phenols of this type are: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-do-decylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithioterephthalate, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate and the calcium salt of monoethyl 3,5-di-tert-butyl-4-hydroxybenzylphosphonate.

Component a is particularly preferably a compound containing at least one group of the formula

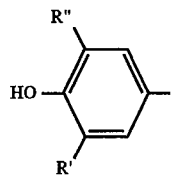
(I)

in which R' is methyl or tert-butyl; and R" is unsubstituted or substituted alkyl or substituted thioether.

Examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, and the amides of these acids, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine.

Also particularly preferred are the following compounds:

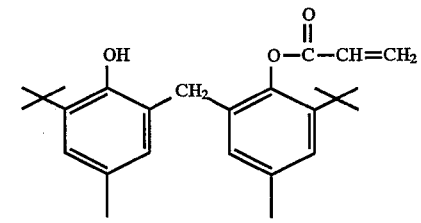

{2-propenoic acid 2-(1,1-dimethylethyl)-6-[[3-(1,1-dimethylethyl)-2-hydroxy-5-methylphenyl]methyl]-4-methylphenylester};

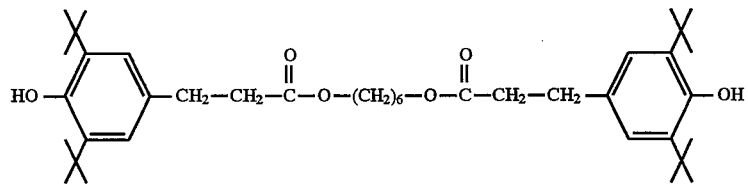

{benzenepropanoic acid 3,5-bis(1,1-dimethyl-ethyl)-4-hydroxy-1,6-hexanediylester};

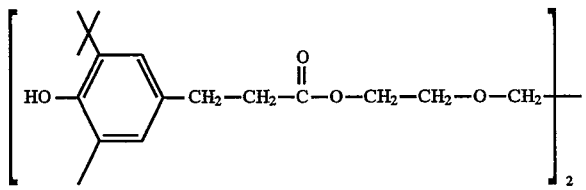

{benzenepropanoic acid 3-(1,1-dimethylethyl)-4-hydroxy)-5-methyl-1,2-ethanediylbis(oxy-2,1-ethanediyl)ester};

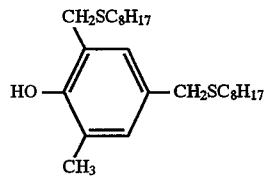

{2-methyl-4,6-bis[(octylthio)methyl]-phenol};

-continued

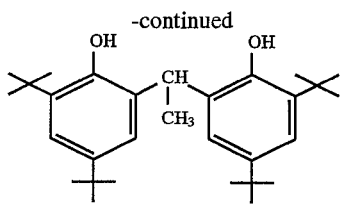

{2,2'-ethylidene-bis-(4,6-di-tert.butylphenol)};

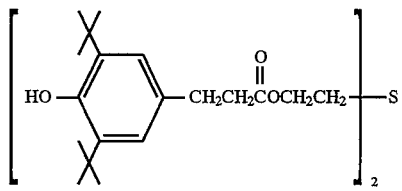

{benzenepropanoic acid 3,5-bis(1,1-dimethylethyl)-4-hydroxy-thiodi-2,1-ethanediylester};

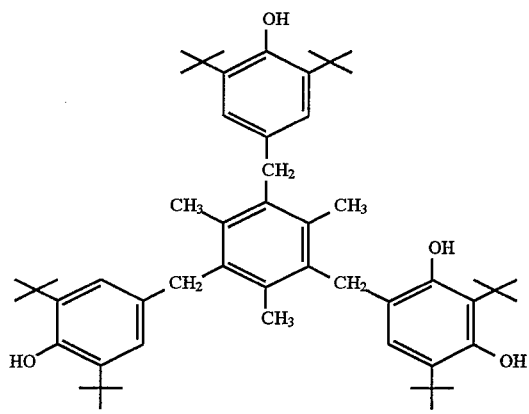

{4,4',4"-[(2,4,6-trimethyl-1,3,5-benzenetriyl)tris-(methylene)]tris[2,6-bis(1,1-dimethylethyl)phenol]};

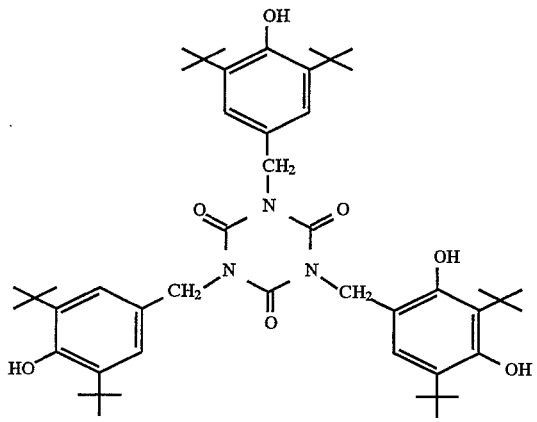

{1,3,5-tris[[3,5-bis(1,1-dimethylethyl)-4-hydroxyphenyl]methyl]-1,3,5-triazine-2,4,6(1H,3H,5H)-trione}.

Component a is most preferably a pentaerythritol ester or octadecyl ester of β-(3,5-di-tert-butyl-4-hydroxyphenyl) propionic acid or 2,2'-ethylidenebis(4,6-di-tert-butyl-phenol).

The organic phosphites and phosphonites used as component b are likewise known as stabilizers for plastics. They are used, in particular, as processing stabilizers for polyolefins.

They are predominantly aromatic phosphites and phosphonites, for example triphenyl phosphite, diphenyl alkyl phosphites, phenyl dialkyl phosphites, tris (nonylphenyl) phosphite, trilauryl phosphite, trioctadecyl phosphite, distearyl pentaerythrityl diphosphite, tris(2,4-di-tert-butylphenyl)phosphite, distearyl pentaerythrityl diphosphite, bis(2,4-di-tert-butylphenyl)pentaerythrityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro [5.5]undecane, 3,9-tris(2,4,6-tris-tert-butylphenoxy)-2,4,8,10-tetraoxa-3,9-diphosphaspiro[5,5] undecane and 2,2'-ethylidenebis(4,6-di-tert-butylphenyl) fluorophosphite.

Preference is given to the following phosphites:
tris(2,4-di-tert-butylphenyl)phosphite;

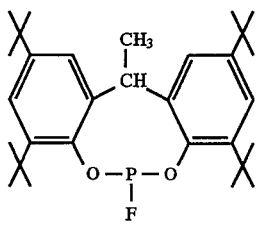

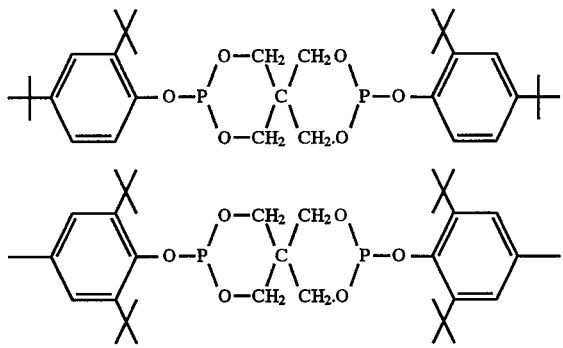

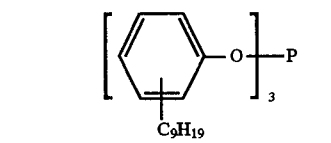

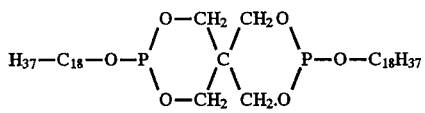

or

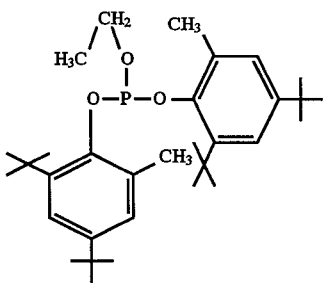

Component b is most preferably tris(2,4-di-tert-butylphenyl)phosphite.

Component c is a metal salt of a fatty acid, in which the metal may be, in particular, an element of main or sub-group II or tin.

These are, in particular, zinc, magnesium, tin or preferably calcium salts from the series consisting of aliphatic saturated $C_2$–$C_{22}$ carboxylates, aliphatic olefinic $C_3$–$C_{22}$ carboxylates, aliphatic $C_2$–$C_{22}$ carboxylates which are substituted by at least one OH group, cyclic or bicyclic $C_5$–$C_{22}$ carboxylates, aromatic $C_7$–$C_{22}$ carboxylates, aromatic $C_7$–$C_{22}$ carboxylates which are substituted by at least one OH group, $C_1$–$C_{16}$ alkyl-substituted phenylcarboxylates and phenyl $C_1$–$C_{16}$ alkylcarboxylates, preference being given to stearates, laurates and behenates.

Component c is very particularly preferably calcium stearate, zinc stearate or magnesium stearate.

It is also possible to use a mixture of various components a, b and c. For example, component c may be a mixture of calcium laurate and calcium stearate or of zinc stearate and calcium stearate.

The present invention furthermore relates to stabilizer mixtures and to the use thereof for recycled mixtures of predominantly thermoplastics obtained from domestic, commercial and industrial waste, useful material collections and used plastics, these stabilizer mixtures comprising a) at least one sterically hindered phenol, b) at least one organic phosphorous or phosphorus ester and c) at least one metal salt of a fatty acid.

Most preferred are stabilizer mixtures comprising per 100 parts (A) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts calcium stearate;

(B) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts of a mixture of calcium and zinc stearates;

(C) as component a) 5–50 parts of octadecyl ester of β-(3,5-di-tert.butyl-4-hydroxyphenyl)-propionic acid, as component b) 5–50 parts of tris-(2,4-di-tert.butylphenyl)-phosphite and as component c) 5–50 parts of calcium stearate; or (D) as component a) 10–40 parts of pentaerythritol ester of β-(3,5-di-tert.butyl-4-hydroxyphenyl)-propionic acid, as component b) 10–40 parts of tris-(2,4-di-tert.butylphenyl)-phosphite and as component c) 20–50 parts of calcium stearate.

The present invention furthermore relates to recycled mixtures of predominantly thermoplastics obtained from domestic, commercial and industrial waste, useful material collections and used plastics, which mixtures contain a) at least one sterically hindered phenol, b) at least one organic phosphorous or phosphorus ester and c) at least one metal salt of a fatty acid.

Preferred recycled mixtures of predominantly thermoplastics, preferred stabilizer mixtures and their use conform in their components and mixing ratios to the preferences described in greater detail under the process.

The addition of these combinations to the recyclate allows thermoplastic processing with reduced degradation and/or extends the service life of the materials produced from the recyclate. This is true irrespective of whether a compatibilizer is added to the recyclate or not. However, the addition of the combination of a, b and c is of particular significance for recyclates to which is added a polymer or polymer mixture which increases the compatibility of the individual plastics with one another, since this polymer generally also requires stabilization.

Further conventional plastic additives can also be polymers which improve the material properties of the previously damaged plastic, for example elastomers (impact modifiers) and compatibilizers. Impact modifiers are homopolymers or copolymers which are able to modify brittle polymers so that they remain tough even at low temperatures. EP(D)M polymers, ABR, BR and SBR graft polymers, inter alia, are suitable for this purpose.

The compatibilizers can be, for example, copolymers, in particular block copolymers, of styrene with butadiene and, if desired, acrylonitrile. They can be copolymers of ethylene and propylene, and may contain a third monomer component, for example butadiene.

Chlorinated polyethylene or ethylene-vinyl acetate copolymers are also suitable as compatibilizers, naturally depending on the particular composition of the recyclate.

Further suitable compatibilizers contain, in particular, polar groups, eg maleic anhydride-styrene copolymers or graft polymers containing acrylic acid groups.

The polymeric compatibilizers are generally used in amounts of 2–20% by weight, based on the plastic to be stabilized.

The stabilizing action of the mixture of a, b and c, in particular the long-term stability, may be synergistically increased by the addition of so-called thiosynergists. These are aliphatic thioethers, in particular esters of thiodipropionic acid. Examples are the lauryl, stearyl, myristyl and tridecyl esters of thiodipropionic acid or distearyl disulfide. These thiosynergists are preferably used in an amount of from 0.1 to 1% by weight, based on the recyclate.

Further suitable stabilizers from the series consisting of the lactates, eg. calcium lactate or calcium stearoyl-2-lactylate, or lactones, eg.

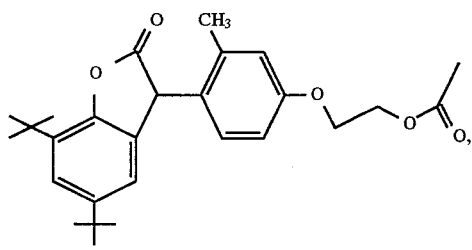

may likewise additionally be added.

If high light stability is also required of the article produced from the recyclate, the addition of one or more light stabilizers is advisable. Suitable light stabilizers are, in particular, those from the series consisting of the benzophenones, benzotriazoles, oxanilides and sterically hindered amines. Examples of such compounds are:

2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2-(2'-Hydroxyphenyl)benzotriazoles, for example the 5'-methyl, 3',5'-di-tert-butyl, 5'-tert-butyl, 5'-(1,1,3,3-tetramethylbutyl),5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.

Oxalamides, for example 4,4'-dioctyloxyoxanilide, 2,2'-dioctyloxy-5,5'-di-tert-butyloxanilide, 2,2'-didodecyloxy-5, 5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

Sterically hindered amines, for example bis(2,2,6,6-tetramethylpiperidyl)sebacate, bis(1,2,2,6,6-pentamethylpiperidyl) sebacate, bis(1-octyloxy-2,2,6,6-tetramethyl-4-piperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine or 4-morpholino-2,6-dichloro-1,3,5-triazine, tetrakis(2,2,6,6-tetramethyl-4-piperidyl) 1,2,3,4-butantetraoate, bis(2,2,6,6-tetramethylpiperidyl) succinate, N-(1,2,2,6,6-pentamethyl-4-piperidyl)-α-dodecylsuccinimide, N-(2,2,6,6-tetramethyl-4-piperidyl)-α-dodecylsuccinimide 2,4,6-tris[N-pentyl-2-(3,3,5,5-tetramethyl-2-oxo-piperazino)ethylamino]-1,3,5-triazine, 2,2,4,4-tetramethyl-7-oxa-3,20-diaza-21-oxo-dispiro[5,1,11,2]heneicosane, 2,2,4,4-tetramethyl-20-(2-dodecyloxycarbonylethyl)-7-oxa-3,20-diaza-21-oxo-dispiro [5,1,11,2]heneicosane, 8-acetyl-3-dodecyl-1,3,8-triaza-7,7, 9,9-tetramethylspiro[4,5]decane-2,4-dione, 1,5,8,12-tetrakis [2,4-bis(N-butyl-1,2,2,6,6-pentamethyl-4-piperidylamino)-1,3,5-triazin-6-yl]-1,5,8,12-tetraazadodecane, and polysiloxanes containing 2,2,6,6-tetramethyl-4-piperidinyl groups.

The light stabilizers are preferably added in an amount of from 0.01 to 2% by weight, in particular from 0.05 to 0.5% by weight, based on the plastic mixture. The light stabilizer used is preferably a combination of a benzotriazole with a sterically hindered amine.

The mixtures according to the invention as well as the additives mentioned can be added to the recyclate in compact, extruded form or on a support material, or directly as a mixture or in the form of powders.

If required, further conventional plastic additives can be added to the recycled plastic, for example fillers, such as sawdust or mica, reinforcing agents, such as glass fibres, glass beads or mineral fibres, pigments, plasticizers, lubricants, flameproofing agents, antistatics or blowing agents. These additives depend on the intended use of the recyclate.

The recyclates stabilized in this way can be used for a very wide variety of applications, for example for tubes, profiles, sheets, cable insulations, sports equipment, garden furniture, films, construction parts, parts of vehicles and machines and containers of all types, for example bottles.

The recyclate can also be mixed with new plastics or employed together with new plastics, for example in a coextrusion process.

The examples below illustrate the novel process and stabilizer mixture in greater detail. As in the remainder of the description, parts are parts by weight and percentages are per cent by weight, unless otherwise stated.

EXAMPLE 1

Used plastic material (PP copolymer from used battery casings) in the form of granules are homogenized with the stabilizers (Table 1) in a screw mixer and subsequently extruded five times one after the other in a twin-screw compounder (temperature 260° C.). The melt flow index (MFI, 230° C., 2.16 kg) is determined before the extrusions and after the 1st, 3rd and 5th extrusions in accordance with DIN 53 735M (ISO 1133/12).

The granules are subsequently converted into sheets (thickness 2 mm) at 240° C. in an injection-moulding machine (Arburg 100). These sheets are subjected to artificial weathering at 135° C. in a fan-assisted oven until they become brittle (Table 2).

TABLE 1

| Stabilizer mixture | Melt flow index after | | | |
|---|---|---|---|---|
| | 0 | 1st | 3rd | 5th extrusion |
| — without stabilizer | 10.6 | 14.6 | 18.7 | 25.2 |
| Ex. 1  0.06% AO-1 + 0.14% P-1 + 0.13% F-1 | 10.6 | 13.2 | 15.6 | 17.8 |

The sample stabilized according to the invention exhibits only a slight increase in melt flow index after repeated extrusion. Due to degradation reactions and decomposition of the polymer (chain breaking), the melt flow index increases.

TABLE 2

Heat ageing of PP from battery casings

| Stabilizer mixture | Days to embrittlement |
|---|---|
| — without stabilizer | 14 |
| Ex. 1a  0.06% AO-1 + 0.14% P-1 + 0.13% F-1 | 50 |

EXAMPLES 2–5

Used plastic material (BOPP: agglomerated production waste from biaxially oriented polypropylene) in the form of granules is homogenized with the stabilizers (Table 2) in a screw mixer and subsequently extruded five times one after the other in a twin-screw compounder (temperature 230° C.). The melt flow index (MFI, 230° C., 2.16 kg) is determined after the 1st, 3rd and 5th extrusions in accordance with DIN 53 735 M (ISO 1133/12).

TABLE 3

Repeated extrusion of BOPP

| Stabilizer mixture | Melt flow index after | | |
|---|---|---|---|
| | 1st | 3rd | 5th extrusion |
| — without stabilizer | 6.0 | 7.1 | 8.3 |
| Ex. 2  0.04% AO-1 + 0.08% P-1 + 0.08% F-1 | 5.6 | 5.8 | 6.4 |
| Ex. 3  0.08% AO-1 + 0.16% P-1 + 0.16% F-1 | 5.5 | 5.9 | 6.0 |
| Ex. 4  0.08% AO-2 + 0.16% P-1 + 0.16% F-1 | 5.7 | 6.0 | 6.5 |
| Ex. 5  0.08% AO-3 + 0.16% P-1 + 0.16% F-1 | 5.7 | 6.0 | 6.5 |

The samples stabilized according to the invention exhibit only a slight increase in the melt flow index after repeated extrusion. Due to degradation reactions and decomposition of the polymer (chain breaking), the melt flow index increases.

The granules are subsequently converted into test specimens (thickness 2 mm) at 230° C. in an injection-moulding machine (Arburg 100). These test specimens are subjected to heat ageing at 135° C. in a fan-assisted oven until they become brittle (Table 4).

TABLE 4

Heat ageing (flexural test) of BOPP

| Stabilizer mixture | Days before embrittlement |
|---|---|
| — without stabilizer | 54 |
| Ex. 2a  0.04% AO-1 + 0.08% P-1 + 0.08% F-1 | 92 |

Further test specimens are stored at 135° C. in a fan-assisted drying cabinet. 5 test specimens are taken after 500 hours, 1000 hours, 1500 hours and 2000 hours in order to determine the tensile impact strength in accordance with DIN 53448 (Table 5).

TABLE 5

Tensile impact strength of BOPP after heat ageing

| Stabilizer mixture | Tensile impact strength (kJ/m$^2$) after | | | |
|---|---|---|---|---|
| | 500 h | 1000 h | 1500 h | 2000 h |
| — without stabilizer | 644 | 480 | 0 | 0 |
| Ex. 2b  0.04% AO-1 + 0.08% P-1 + 0.08% F-1 | 607 | 669 | 643 | 634 |

EXAMPLES 6–8

Used BOPP material (biaxially oriented PP production waste) in the form of granules is homogenized with the stabilizers (Table 6) in a screw mixer and subsequently extruded once in a twin-screw compounder. The granules are subsequently converted into test specimens at 230° C. in an injection-moulding machine (Arburg 100). For exposure testing, these test specimens are stored in an Atlas Ci 65 A Weather-O-Meter. 5 test specimens are taken after UV exposure for 500 hours, 100 hours, 1500 hours and 2000 hours in order to determine the tensile impact strength in accordance with DIN 53448.

EXAMPLE 10–22

Used plastic material (average composition: HDPE/PP= 90/10, originating from hollow articles) is extruded with the stabilizers (Table 8) at 240° C. The granules are subsequently converted into sheets (thickness 2 mm) at 220° C. in an injection-moulding machine (Arburg 100). These test specimens are subjected to artificial weathering at 120° C. in a fan-assisted oven until they become brittle.

Further test specimens are stored at 120° C. in a fan-assisted drying cabinet. 5 test specimens are taken after 500 hours, 1000 hours and 1500 hours in order to determine the tensile impact strength (Table 9) in accordance with DIN 53448.

TABLE 6

Tensile impact strength of BOPP after artificial weathering in a Weather-O-Meter

|  | Stabilizer mixture | Tensile impact strength (kJ/m$^2$) after weathering in the WOM | | | |
|---|---|---|---|---|---|
|  |  | 0 h | 1000 h | 1500 h | 2000 h |
| — | without stabilizer | 278 | 37 | — | — |
| Ex. 6 | 0.01% AO-1 + 0.02% P-1 + 0.08% F-1 + 0.06% LS-1 + 0.03% LS-2 | 332 | 329 | 330 | 274 |
| Ex. 7 | 0.02% AO-1 + 0.04% P-1 + 0.16% F-1 + 0.12% LS-1 + 0.06% LS-2 | 301 | 323 | 326 | 297 |
| Ex. 8 | 0.03% AO-1 + 0.06% P-1 + 0.24% F-1 + 0.18% LS-1 + 0.09% LS-2 | 253 | 364 | 331 | 304 |

EXAMPLE 9

Used HDPE material (drum goods) in the form of granules is homogenized with the stabilizers (Table 7) in a screw mixer and subsequently extruded five times one after the other in a twin-screw compounder (ZSK) at 230° C. The melt flow index (MFI, 230° C./10 kg) is determined after the 1st, 3rd and 5th extrusions in accordance with DIN 53735 M (ISO 1133/12).

TABLE 7

Used HDPE material (drum goods), repeated extrusion

|  | Stabilizer mixture | Melt flow index after | | |
|---|---|---|---|---|
|  |  | 1st | 3rd | 5th extrusion |
| — | without stabilizer | 0.67 | 0.46 | 0.37 |
| Ex. 9 | 0.04% AO-1 + 0.08% P-1 + 0.08% F-1 | 0.70 | 0.68 | 0.69 |

The sample stabilized according to the invention exhibits no drop in melt flow index after repeated extrusion. Due to crosslinking of the polymer, the melt flow index of the sample which has not subsequently been stabilized drops.

TABLE 8

Artificial weathering (flexural test) of Polyolefin mixtures (HDPE/PP = 90/10)

|  | Stabilizer mixture | Days before embrittlement |
|---|---|---|
|  | without stabilizer | 37 |
| Ex. 10 | 0.04% AO-1 + 0.08% P-1 + 0.08% F-1 | 87 |
| Ex. 11 | 0.08% AO-1 + 0.16% P-1 + 0.16% F-1 | 109 |
| Ex. 12 | 0.16% AO-1 + 0.08% P-1 + 0.16% F-1 | 68 |
| Ex. 13 | 0.04% AO-2 + 0.08% P-1 + 0.08% F-1 | >84 |

TABLE 8-continued

Artificial weathering (flexural test) of Polyolefin mixtures (HDPE/PP = 90/10)

| Stabilizer mixture | | Days before embrittlement |
|---|---|---|
| Ex. 14 | 0.08% AO-2 + 0.16% P-1 + 0.16% F-1 | >84 |
| Ex. 15 | 0.04% AO-3 + 0.08% P-1 + 0.08% F-1 | >84 |
| Ex. 16 | 0.08% AO-3 + 0.16% P-1 + 0.16% F-1 | >84 |
| Ex. 17 | 0.04% AO-1 + 0.08% P-1 + 0.08% F-2 | >84 |
| Ex. 18 | 0.08% AO-1 + 0.16% P-1 + 0.16% F-2 | >84 |
| Ex. 19 | 0.04% AO-1 + 0.08% P-1 + 0.05% F-1 + 0.03% F-2 | >84 |
| Ex. 20 | 0.08% AO-1 + 0.16% P-1 + 0.10% F-1 + 0.06% F-2 | >84 |
| Ex. 21 | 0.04% AO-1 + 0.08% P-1 + 0.018% F-1 + 0.027% F-2 + 0.035% Z-1 | >84 |
| Ex. 22 | 0.08% AO-1 + 0.16% P-1 + 0.036% F-1 + 0.054% F-2 + 0.070% Z-1 | >84 |

TABLE 9

Tensile impact strength of polyolefin mixtures after heat ageing

| | Stabilizer mixture | Tensile impact strength (kJ/m$^2$) after | | |
|---|---|---|---|---|
| | | 500 h | 1000 h | 1500 h |
| — | without stabilizer | 777 | 37 | — |
| Ex. 10a | 0.04% AO-1 + 0.08% P-1 + 0.08% F-1 | 954 | 961 | 914 |
| Ex. 11a | 0.08% AO-1 + 0.16% P-1 + 0.16% F-1 | 870 | 980 | 800 |
| Ex. 12a | 0.16% AO-1 + 0.08% P-1 + 0.16% F-1 | >1250 | 1178 | >1250 |

EXAMPLES 23 and 24

A mixture of 36.14 g of BOPP film granules, 0.029 g of AO-1, 0.014 g of P-1 and 0.029 g of F-1 (or 0.014 g of AO-1, 0.029 g of P-1 and 0.029 g of F-1 in the case of Example 24) is compounded for 30 minutes at 200° C. under nitrogen in a Brabender mixing chamber (Brabender Plasticorder PL 2001/3, W50 mixing chamber). At the same time, the change in torque, i.e. the force necessary to rotate the compounding blades, is recorded (Table 10).

After a mixing time of 30 minutes, the polymer melt is removed from the Brabender chamber and pressed at 200° C. to give sheets 2 mm thick. Test specimens are stamped out of these sheets and used to determine the tensile impact strength in accordance with DIN 54 448 on unnotched test specimens (Table 10).

The melt flow index (MFI, 230° C., 2.16 kg) is determined on fragments of the above sheets in accordance with DIN 53 735M CiSO 1133/12) (Table 10).

the polymer (chain breaking), the torque drops and the melt flow index increases.

EXAMPLES 25–40

For the analyses with mixed plastic, a used plastic mixture of the composition

80% of PO lightweight fraction

15% of PS

2% of PET

3% of PVC is used 39 g of the used plastic mixture are compounded for 10 minutes in a Brabender W 50 mixing chamber held at 200° C. (40 rpm). The additives (Table 11) are introduced into the mixing chamber right at the beginning together with the plastic mixture. After 10 minutes, the mixing is stopped, and the polymer material is removed from the mixing chamber and pre-pressed for 1 minute at 20 kN at 30° C.

TABLE 10

| | Torque [Nm] after a mixing time of | | | | | Tensile impact strength | Melt flow index |
|---|---|---|---|---|---|---|---|
| | 2 | 5 | 10 | 20 | 30 min | [kJ/m$^2$] | [g/10 min] |
| without stab. | 9.2 | 7.1 | 6.4 | 4.8 | 3.7 | 74 | 30.8 |
| Ex. 23 | 8.5 | 7.3 | 6.8 | 6.5 | 5.5 | 167 | 13.5 |
| Ex. 24 | 8.4 | 7.3 | 6.7 | 6.3 | 5.3 | 115 | 15.0 |

The samples stabilized according to the invention exhibit a slight drop in torque, high tensile impact strength and low melt flow index compared with the sample without stabilizers. Due to degradation reactions and decomposition of Sheets with a thickness of 2 mm are produced from this pressing at 200° C./50 kN.

Test specimens are stamped out of these sheets and aged at 110° C. in a fan-assisted oven. The ageing is continued until the samples become brittle, which is checked by a flexural test. The results of the heat ageing are shown in Table 11.

TABLE 11

Heat ageing at 110°, flexural test
mixed plastics (80% of PO, 15% of PS, 2% of PET, 3% of PVC)

|        | %                | Additive     | Days before embrittlement |
|--------|------------------|--------------|---------------------------|
| —      | —                | none         | 4                         |
| Ex. 25 | 0.02/0.06/0.12   | F-1/AO-1/P-1 | 27                        |
| Ex. 26 | 0.08/0.06/0.06   | F-1/AO-1/P-1 | 18                        |
| Ex. 27 | 0.08/0.096/0.024 | F-1/AO-1/P-1 | 16                        |
| Ex. 28 | 0.16/0.12/0.12   | F-1/AO-1/P-1 | 18                        |
| Ex. 29 | 0.16/0.192/0.048 | F-1/AO-1/P-1 | 21                        |
| Ex. 30 | 0.16/0.048/0.192 | F-1/AO-1/P-1 | 14                        |
| Ex. 31 | 0.04/0.12/0.24   | F-1/AO-1/P-1 | 24                        |
| Ex. 32 | 0.08/0.04/0.08   | F-1/AO-1/P-1 | 9                         |
| Ex. 33 | 0.16/0.08/0.16   | F-1/AO-1/P-1 | 23                        |
| Ex. 34 | 0.08/0.04/0.08   | F-2/AO-1/P-1 | 12                        |
| Ex. 35 | 0.08/0.04/0.08   | F-3/AO-1/P-1 | 16                        |
| Ex. 36 | 0.02/0.06/0.12   | F-1/AO-2/P-1 | 19                        |
| Ex. 37 | 0.08/0.096/0.024 | F-1/AO-2/P-1 | 12                        |
| Ex. 34 | 0.08/0.024/0.096 | F-1/AO-2/P-1 | 12                        |
| Ex. 38 | 0.16/0.12/0.12   | F-1/AO-2/P-1 | 14                        |
| Ex. 39 | 0.16/0.192/0.048 | F-1/AO-2/P-1 | 19                        |
| Ex. 40 | 0.04/0.12/0.24   | F-1/AO-2/P-1 | 17                        |

10 min Brabender 200° C.
2 mm pressed sheet

EXAMPLES 41–44

7.5 parts of a compatibilizer based on S(EB)S block copolymer are added to the used plastic mixture.

The procedure is analogous to Example 25.

The results are shown in Table 12.

TABLE 12

Artificial ageing at 110°, flexural test
mixed plastics (80% of PO, 15% of PS, 2% of PET, 3% of PVC)
7.5% of compatibilizer (based on S(EB)S block copolymer)

|        | %                   | Additive            | Days before embrittlement |
|--------|---------------------|---------------------|---------------------------|
| —      | —                   | none                | 4                         |
| Ex. 41 | 0.08/0.04/0.08      | F-1/AO-1/P-1        | 9                         |
| Ex. 42 | 0.08/0.04/0.08/0.2  | F-1/AO-1/P-1/T-1    | 37                        |
| Ex. 43 | 0.06/0.03/0.06/0.05 | F-1/AO-1/P-1/AO-2   | 20                        |
| Ex. 44 | 0.08/0.8/0.4        | F-1/P-1/AO-3        | 11                        |

10 min Brabender 200° C.
2 mm pressed sheet

EXAMPLES 45–47

45 g of EPS recyclate (granules) are compounded for 10 minutes in a Brabender W 50 mixing chamber held at 200° C. (40 rpm). The additives (Table 13) are introduced into the mixing chamber fight at the beginning together with the plastic mixture. After 10 minutes, the mixing is stopped, and the polymer material is removed from the mixing chamber and pre-pressed for 1 minute at 20 kN at 30° C.

Sheets with a thickness of 2 mm are produced from this pressing at 200° C./50 kN.

The melt volume index is determined from this pressing after comminution.

The samples stabilized according to the invention exhibit only a slight increase in melt volume index (Table 13) compared to the non-stabilized sample.

TABLE 13

Brabender experiment (20 min, 220° C., 40 rpm)
using EPS recyclate from packaging (granules)

|        | %              | Additive     | MVI (200/5) |
|--------|----------------|--------------|-------------|
| —      | —              | none         | 56.8        |
| Ex. 45 | 0.08/0.04/0.08 | F-1/AO-1/P-1 | 44.6        |
| Ex. 46 | 0.08/0.04/0.08 | F-1/AO-2/P-1 | 44.5        |
| Ex. 47 | 0.08/0.04/0.06 | F-1/AO-4/P-1 | 39.0        |

EXAMPLES 48 and 49

36 g of used LDPE are compounded for 10 minutes in a Binbender W 50 mixing chamber held at 200° C. (40 rpm). The additives (Table 14) are introduced into the mixing chamber right at the beginning together with the plastic mixture. After 10 minutes, the mixing is stopped, and the polymer material is removed from the mixing chamber and pre-pressed for 1 minute at 20 kN at 30° C.

Sheets with a thickness of 2 mm are produced from this pressing at 200° C./50 kN.

Test specimens are stamped out of these sheets and aged at 110° C. in a fan-assisted oven. The ageing is continued until the samples become brittle, which is checked by a flexural test. The results of the artificial ageing are shown in Table 14.

TABLE 14

Heat ageing at 110°, flexural test
Used LDPE

|        | %              | Additive     | Days before embrittlement | OIT [min] |
|--------|----------------|--------------|---------------------------|-----------|
| —      | —              | none         | 7                         | 3         |
| Ex. 48 | 0.08/0.04/0.08 | F-1/AO-1/P-1 | >70                       | 8         |
| Ex. 49 | 0.16/0.08/0.16 | F-1/AO-1/P-1 |                           | 19        |

10 min Brabender 200° C.
2 mm pressed sheet
OIT: Oxygen Induction Time, at 200° C., in accordance with ASTM D 3895-80, heating rate 10° C./min

EXAMPLES 50–52

A PP/LDPE agglomerate is used for the testing. A compatibilizer is added to this agglomerate.

Comp.=compatibilizer (based on PE grafted with maleic anhydride).

36.7 g of the mixture of agglomerate and compatibilizer are compounded for 10 minutes in a Brabender W 50 mixing chamber held at 200° C. (40 rpm). The additives (Table 15) are introduced into the mixing chamber right at the beginning together with the plastic mixture. After 10 minutes, the mixing is stopped, and the polymer material is removed from the mixing chamber and pre-pressed for 1 minute at 20 kN at 30° C.

Sheets with a thickness of 2 mm are produced from this pressing at 200° C./50 kN and the tensile impact strength in accordance with DIN 53448 is determined.

The melt volume index is determined from this pressing after comminution.

Brabender analysis (200° C., 40 rpm, 10 min)
PP/LDPE agglomerate (50/50)
Comp. = compatibilizer
(Based on PE grafted with maleic anhydride)

|  | % | Additive | MVI (190/2.16) | Tensile impact strength [kJ/m$^2$] |
|---|---|---|---|---|
| — | — | none | 22.39 | 60 |
| Ex. 50 | 2.5/0.08/0.04/0.08 | Comp./F-1/AO-1/P-1 | 16.85 | 106 |
| Ex. 51 | 5.0/0.08/0.04/0.08 | Comp./F-1/AO-1/P-1 | 12.70 | 135 |
| Ex. 52 | 7.5/0.08/0.04/0.08 | Comp./F-1/AO-1/P-1 | 9.70 | 153 |

2 mm pressed sheet

The following stabilizers are used:
AO-1 Pentaerythritol ester of β-(3,5-di-tert-butyl-4-hydroxyphenyl)propionic acid
AO-2 Octadecyl ester of β-(3,5-di-tert.butyl-4-hydroxyphenyl)-propionic acid
AO-3 2,2'-ethylidene-bis-(4,6-di-tert.butyl-phenol)
AO-4 benzenepropionic acid 3-(1,1-dimethylethyl)-4-hydroxy-5-methyl-1,2-ethanediylbis(oxy-2,1-ethanediyl)ester
F-1 calcium stearate
F-2 zinc stearate
F-3 magnesium stearate
LS-1 5-chloro-3',5'-di-tert.butyl-2(2'-hydroxyphenyl)-benzotriazole
LS -2 bis-(2,2,6,6-tetramethylpiperidyl)-sebacate
P-1 Iris-(2,4-di-tert.butylphenyl) phosphite
T-1 3,3'-thiobispropionic acid-dioctadecyl ester
Z-1 pentaerythritol

What is claimed is:

1. A process for the stabilization of recycled plastics, consisting essentially of thermoplastics with up to 5% of non-thermoplastics, which process comprises adding from 0.01 to 10% by weight of a mixture of
   (A) as component a) 5–50 parts of pentaerythritol ester of β-(3,5-di-tert.butyl-4-hydroxy-phenyl)-propionic acid, as component b) 5–50 parts of tris-(2,4-di-tert.butylphenyl)-phosphite and as component c) 5–50 parts calcium stearate;
   (B) as component a) 5–50 parts of pentaerythritol ester of β-(3,5-di-tert.butyl-4-hydroxy-phenyl)-propionic acid, as component b) 5–50 parts of tris-(2,4-di-tert.butylphenyl)-phosphite and as component c) 5–50 parts of a mixture of calcium and zinc stearates;
   (C) as component a) 5–50 parts of octadecyl ester of β-(3,5-di-tert.butyl-4-hydroxyphenyl)-propionic acid, as component b) 5–50 parts of tris-(2,4-di-tert.butylphenyl)-phosphite and as component c) 5–50 parts of calcium stearate; or
   (D) as component a) 10–40 parts of pentaerythritol ester of β-(3,5-di-tert.butyl-4-hydroxy-phenyl)-propionic acid, as component b) 10–40 parts of tris-(2,4-di-tert.butylphenyl)-phosphite and as component c) 20–50 parts of calcium stearate.

2. A process according to claim 1, wherein the a:b weight ratio is from 10:1 to 1:10 and the (a+b):c weight ratio is from 5:1 to 1:5.

3. A process according to claim 1, wherein the recycled plastics are in the form of a mixture which comprises 25–100% by weight of polyolefins, 0–25% of polystyrene, 0–25% of polyvinyl chloride and 0–25% of other thermoplastics.

4. A process according to claim 1, wherein the recycled plastics are in the form of a mixture which comprises 55–95% by weight of polyolefins, 5–25% of polystyrene, 0–15% of polyvinyl chloride and 0–10% of other thermoplastics.

5. A process according to claim 1, wherein the recycled plastics are in the form of single-material recyclates from the series consisting of the polyolefins and polystyrene.

6. A process according to claim 1, wherein the recycled plastics are in the form of polypropylene recyclates and corresponding copolymers.

7. A process according to claim 1, wherein the recycled plastics are in the form of polyethylene recyclates.

8. A process according to claim 1, wherein the recycled plastics are in the form of polyolefin mixtures from industrial separation processes.

9. A process according to claim 1, wherein from 0.05 to 5% by weight of the mixture of a, b and c is added to the recycled plastic.

10. A process according to claim 1, wherein the plastic recyclate additionally contains a polymer or polymer mixture which increases the compatability of the individual plastics with one another.

11. A process according to claim 1, wherein the plastic recyclate additionally contains a polymer or polymer mixture in an mount of 2–20% by weight, based on the plastic recyclate mixture, which increases the comparability of the individual plastics with one another.

12. A process according to claim 1, wherein a thiosynergist from the series consisting of the esters of thiodipropionic acid is additionally added to the plastic recyclate.

13. A process according to claim 1, wherein a thiosynergist from the series consisting of the esters of thiodipropionic acid is additionally added in an mount of from 0.1 to 1% by weight, based on the plastic recyclate, to the plastic recyclate.

14. A process according to claim 1, wherein at least one light stabilizer from the series consisting of the benzophenones, benzotriazoles, oxanilides and sterically hindered mines is additionally added to the plastic recyclate.

15. A process according to claim 1, wherein at least one light stabilizer from the series consisting of the benzophenones, benzotriazoles, oxanilides and sterically hindered mines is additionally added to the plastic recyclate and the mount of the light stabilizer(s) is from 0.01 to 2% by weight, based on the plastic recyclate.

16. A process according to claim 1, wherein a light stabilizer from the series consisting of the benzotriazoles and a light stabilizer from the series consisting of the sterically hindered mines are added.

17. A stabilizer mixture for recycled plastics, predominantly thermoplastics, obtained from domestic, commercial or industrial waste or useful material collections, comprising per 100 parts (A) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts calcium stearate;

(B) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts of a mixture of calcium and zinc stearates;

(C) as component a) 5–50 parts of octadecyl ester of β-(3,5-di-tert.butyl-4-hydroxyphenyl)-propionic acid, as component b) 5–50 parts of tris-(2,4-di-tert.butylphenyl)-phosphite and as component c) 5–50 parts of calcium stearate; or (D) as component a) 10–40 parts of pentaerythritol ester of β-(3,5-di-tert.butyl-4-hydroxyphenyl)-propionic acid, as component b) 10–40 parts of tris-(2,4-di-tert.butylphenyl)-phosphite and as component c) 20–50 parts of calcium stearate.

18. A recycled plastic, consisting essentially of thermoplastics with up to 5% of non-thermoplastics, which contains from 0.01 to 10% by weight of a mixture of (A) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts calcium stearate;

(B) as component a) 5–50 parts of pentaerythritol ester of β-(3,5-di-tert.butyl-4-hydroxyphenyl)-propionic acid, as component b) 5–50 parts of tris-(2,4-di-tert.butylphenyl)-phosphite and as component c) 5–50 parts of a mixture of calcium and zinc stearates;

(C) as component a) 5–50 parts of octadecyl ester of β-(3,5-di-tert.butyl-4-hydroxyphenyl)-propionic acid, as component b) 5–50 parts of tris-(2,4-di-tert.butylphenyl)-phosphite and as component c) 5–50 parts of calcium stearate; or (D) as component a) 10–40 parts of pentaerythritol ester of β-(3,5-di-tert.butyl-4-hydroxyphenyl)-propionic acid, as component b) 10–40 parts of Iris-(2,4-di-tert.butylphenyl)-phosphite and as component c) 20–50 parts of calcium stearate.

\* \* \* \* \*